May 5, 1942.   A. J. BARR ET AL   2,281,660
CROP DIVIDER FOR MOWING MACHINES
Filed Nov. 23, 1940    3 Sheets-Sheet 1
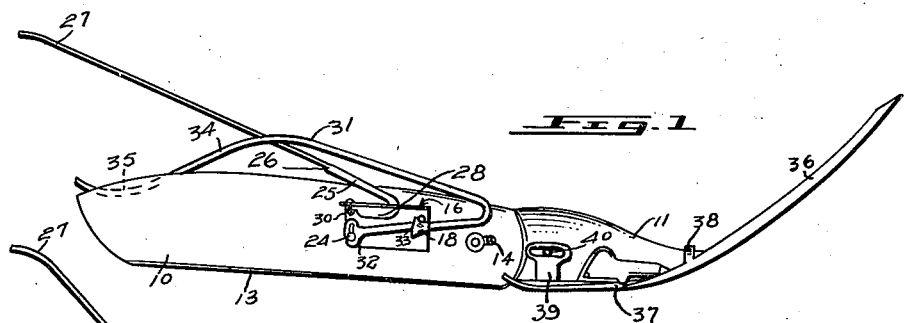
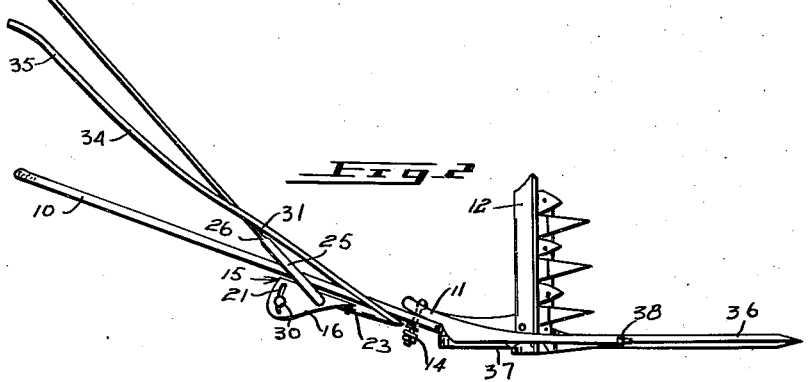
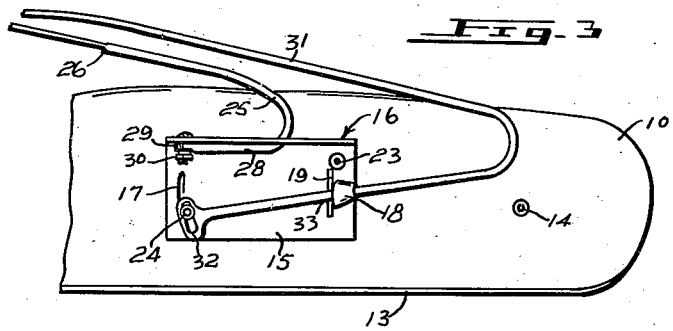
INVENTORS
Alexander J. Barr and
Honorius A. Arbic
By Ralph Burch
Attorney May 5, 1942.   A. J. BARR ET AL   2,281,660
CROP DIVIDER FOR MOWING MACHINES
Filed Nov. 23, 1940   3 Sheets-Sheet 2
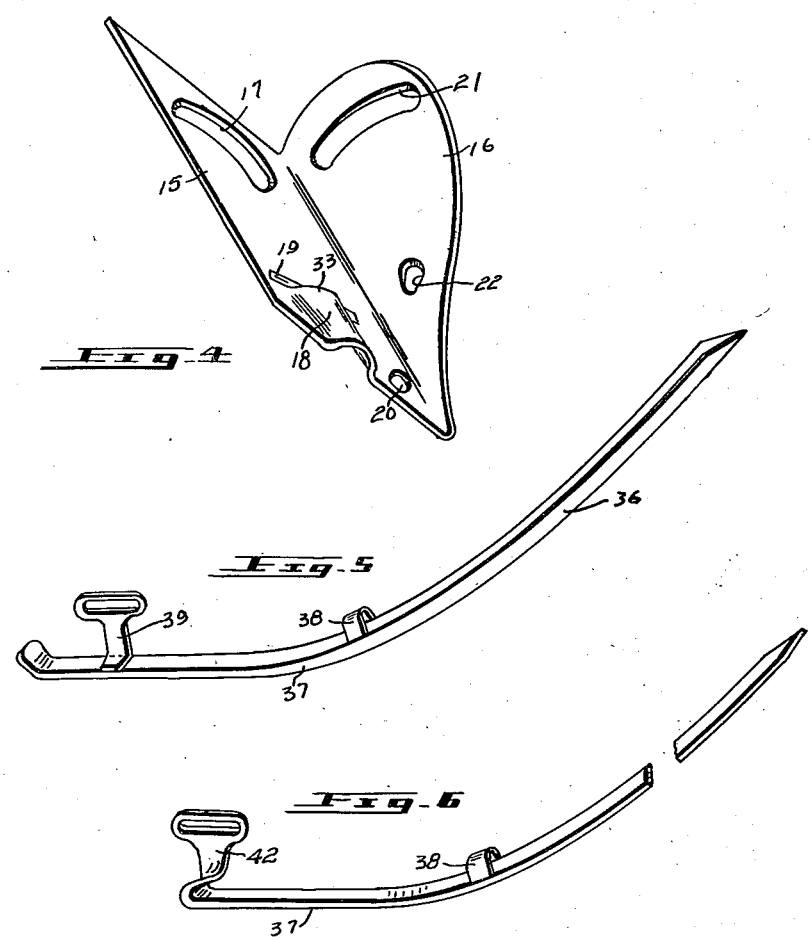
INVENTORS
Alexander J. Barr and
Honorius A. Arbic
By Ralph Burch
Attorney May 5, 1942.  A. J. BARR ET AL  2,281,660
CROP DIVIDER FOR MOWING MACHINES
Filed Nov. 23, 1940   3 Sheets-Sheet 3

INVENTORS
Alexander J. Barr and
Honorius A. Arbic
By Ralph Burch
Attorney

Patented May 5, 1942

2,281,660

UNITED STATES PATENT OFFICE 2,281,660

CROP DIVIDER FOR MOWING MACHINES

Alexander John Barr, Carp, Ontario, and Honorius Antoine Arbic, Bristol, Quebec, Canada Application November 23, 1940, Serial No. 366,922

3 Claims. (Cl. 56—314)

This invention relates to farm implements and more particularly to improvements in dividers for moving machines which consists essentially of an attachment secured to and operatively associated with the divider or swath board of the mowing machine.

The principal object of this invention is to provide means to separate and deposit the cut swath from the standing crop as the mowing machine moves forward in operation. The cut swath is directed away from the standing crop in predetermined distance during the separating and depositing thereof with the result that a clear line of division is obtained leaving a track of considerable width between the cut and uncut crop so that on each successive round ample room is left for the inner shoe of the cutting bar to ride on clear stubble ground which consequently prevents all choking and clogging of the knife and knife guard.

Another important object is to deposit the cut swath on the ground by positive contact of the device so that it is firmly and uniformly set in a semi-upright position which will not tend to be blown back onto the track on windy days or due to other disturbing factors and which enables the cut crop to dry out much more readily.

Still another object is to clearly define the swath to be cut and to part the swath from the crops just prior to the action of the cutter bar as the mowing machine moves progressively forward. The clear line of division causes the elimination of fringes of uncut crop along the outer edge of the track away from the hay mower.

The more particular advantages of the present device include an improved bracket to be attached to the divider board which is extremely light yet durable and which has means formed integral therewith to adjustably secure the divider arm therein. The divider arm is reduced from a predetermined position throughout its length to increase the flexibility thereof. Formerly the heavier divider arms where inclined to break because of an overload of bunched grain or hay; with the adoption of the present device this objection will be obviated by the increased flexibility of the divider arm. An improved longer divider prong is made of record in which modified attachment means are illustrated. The principal objects including means to strengthen the divider prong and means to secure the prong to the casing in an inexpensive and efficient manner. This latter feature is of considerable importance as it has been found that the shorter divider prong fails to adequately part the crop.

The pertinent features of my improved divider attachment are to decrease the weight of the existing types of dividers to increase the durability thereof and to eliminate the necessity of a tucker arm, and to adequately divide the swath to be cut from the standing crop.

With the above noted and other objects in view which may appear as the description proceeds the invention resides in the novel construction, combination and arrangement of cooperating parts as hereinafter more specifically set forth, claimed and shown in the accompanying drawings forming part of this application and in which:

Fig. 1 is a side elevation view of the invention assembled on the swath board of a mowing machine.

Fig. 2 is a top plan view of the device illustrated in Fig. 1.

Fig. 3 is a fragmentary view of the swath board illustrating the attachment means in detail.

Fig. 4 is a perspective view of the attachment bracket.

Figs. 5 and 6 are perspective views of two embodiments of the divider prong.

Figure 7:
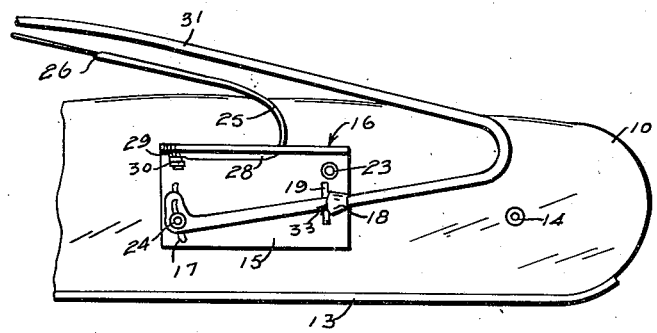
Fig. 7 is a view similar to Fig. 3, illustrating a slightly modified form of construction.
Figure 8:
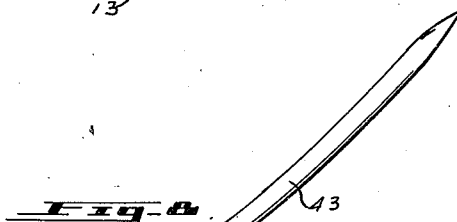
Figs. 8, 9 and 10, are perspective views of further modifications of the divider prong.

Referring more in detail to the drawings in which similar reference characters designate corresponding parts throughout the several views 10, is the divider board or swath board, 11, the casting at the outer end of the cutter bar 12. The swath board 10, rides on a metal shoe 13, and is secured to the casting 11, by means of a heavy bolt 14. The foregoing briefly describes the usual construction of the swath board and related parts at the extremity of the cutter bar of a mowing machine and to which my improved divider for mowing machines is attached.

The device consists of a divider prong secured to the casting 11, which is effective before the crop is cut and a divider arm and guard arm which cooperate with each other and are effective after the crop is cut as the mowing machine progresses along any given swath. The divider arm and guard arm are secured to the swath board by means of a bracket 15, and will hereinafter be described in detail.

The bracket 15 (see Fig. 4), is provided with a horizontal apron 16, which complements the vertical portion of the bracket. This apron 16, is cut away in part so that excess material which bears no relation to the operation and assembly of the device is obviated with a consequent reduction in weight. The vertical side of the bracket has an arcuate slot 17, cut therein, a channel 18, formed by slitting the bracket at 19, and raising or moulding the portion of the plate between the slit 19, and the rear edge of the bracket, and an annular aperture 20. The apron 16, is provided with an arcuate slot 21, and an annular aperture 22.

The bracket is pivotally mounted to the outside face of the swath board by means of the nut and bolt 23, which projects through the aperture 20, of the bracket and is arranged for adjustment thereon by means of a nut and bolt 24, which projects through the arcual slot 17.

Mounted in the apron 16, of the bracket is the divider arm 25, which is reduced at 26, and extends angularly inward from the swath board throughout its length, the extremity of the divider arm is curved at 27, away from the line of fall of the cut crop so that the individual blades will clear the divider arm easily and smoothly as the arm travels forward. The said divider arm is inserted through the aperture 22, and the bent back portion 28, terminates in a lug 29, which registered with the arcuate slot 21, in the apron 16, a nut and bolt 30 is provided to secure the rod in adjustable engagement with the apron of the said bracket.

The guard rod 31, is adjustably secured to the vertical portion of the bracket 15, by means of the channel 18, and the nut and bolt 24, which secures the terminal T slot 32, of the guard rod. It should be noted that the forward end of the channel 18, fits snugly about the guard rod and that the rearward end is larger 33, which permits of vertical play of the guard rod which is secured in any predetermined position by tightening the nut and bolt 24. The said guard rod curves back on itself and projects rearwardly at a lesser angle than the divider rod in relation to the swath board and finally curves downward at 34, and terminates in the runner portion 35, which cooperates with the divider rod in that from the directional impetus given to the cut crop by dividing rod the crop is finally set firmly on the ground by the guard rod so that any tendency of the cut crop to blow back into the standing crop will be obviated.

In cooperating arrangement with the above we provide a dividing prong 36 (Figs. 1 and 2), which has a shoe portion 37, to carry the casting 11, in place of the usual shoe. The dividing prong is provided with a loop member 38, adapted to fit over the nose of the casting 11, and be secured frictionally thereto by means of the lug 39, projecting from the shoe portion 37, which cooperates with the bolt 40, of the casting.

Figure 9:
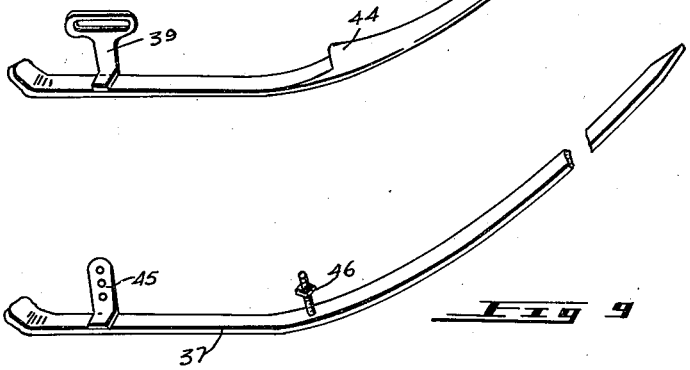
Figure 10:
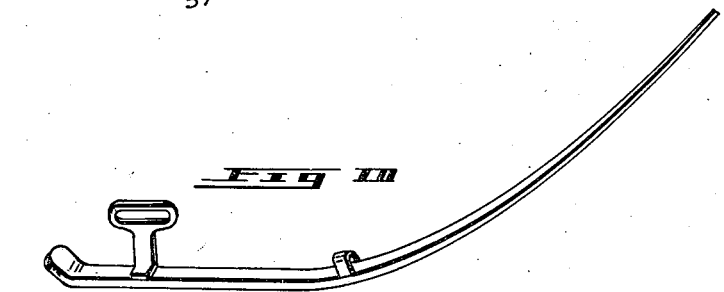

In the drawings Figs. 5, 6, 8, 9 and 10 illustrate preferred forms of the divider prong. Fig. 5 discloses a V-shaped, pointed prong having a T shaped lug 39, welded or otherwise secured thereto. The elongated slot of the lug permits attachment of the divider prong to mowers having different size castings 11. Fig. 6 illustrates a flat divider prong in which the extremity of the shoe 37, terminates in a lug 42, formed integral with the said shoe; in Fig. 8 I have provided a tubular prong 43, which considerably increases the strength thereof if it should be found that excessive breakage results in heavy crops. The tube is raised or expanded at 44, to take the nose of the casting 11, in the same manner as the loop 38. Fig. 9 discloses a further modification in which the lug 45, is adapted for vertical adjustment and the prong is further secured to the nose of the casting 11, by means of a bolt 45, inserted through an aperture cut in the nose of the said casting 11, and Fig. 10 shows a thin pointed apron extending outward and upward from the casting 11, adaptable for use in light crops, the effect is to more effectively project through and part the crop.

It should be noted that any combination of parts referred to with regards to the disclosure of the divider prong in Figs. 5, 6, 8, 9 and 10, may be resorted to in actual practice.

The divider prong projects forwardly and upwardly from the casting 11 and divides or cuts through the crop so that the part to be cut is clearly free of the standing crop when the cutter bar moves progressively forward, immediately after the swath is cut it is directed inward, away from the standing crop by means of the divider arm 26, and tends to fall horizontally to the ground, assisted in this respect by the guard arm 31, which continues to direct the falling blades until they are firmly pressed to the ground as the runner portion 35, passes over them in a continuous operation.

It is believed that the construction and advantages of the device may be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

We claim:

1. In an attachment for mowing machines, the combination with a swath board, of a bracket secured to the outer face of the swath board having a horizontal apron, a divider rod having one end pivotally mounted in an aperture in the apron of the bracket, said end being reversely bent and adjustably secured to the underside of the apron, said divider rod for the greater portion of its length being of less diameter than its attaching end to increase its flexibility, and a guard rod adjustably attached to the vertical face of said bracket and bent to extend angularly and rearwardly from the swath board in crossed relation to said divider rod, said guard being less flexible than said divider rod.

2. In an attachment for mowing machines, the combination with a swath board, of a bracket secured to the outer face of the swath board having a vertical face and horizontal apron, said vertical face having a bearing pressed outwardly from one end, the inner end of said bearing being of greater width than its outer end, a guard rod having one end passing through said bearing and adjustably secured to the vertical face by a bolt engaging in an arcuate slot in the vertical face and a divider rod having one end pivotally and adjustably mounted in the horizontal apron of the bracket, said divider and guards rods extending angularly and rearwardly from the swath board.

3. In an attachment for mowing machines, the combination with a swath board, of an angular bracket having one face pivotally secured to the side of the swath board and provided at one end with a pressed out tapered bearing and at its opposite end with an arcuate slot, a guard rod having one end passing through the bearing and adjustably secured in position by a bolt passing through the arcuate slot and the swath board, and a divider rod having one end pivotally and adjustably mounted in the horizontal face of said bracket, said guard and divider rods extending angularly and rearwardly from said swath board.

ALEXANDER JOHN BARR.
HONORIUS ANTOINE ARBIC.